United States Patent [19]

Nash et al.

[11] 4,106,587

[45] Aug. 15, 1978

[54] SOUND-SUPPRESSING STRUCTURE WITH THERMAL RELIEF

[75] Inventors: Dudley O. Nash, Forest Park; Joseph Holowach, Cincinnati, both of Ohio

[73] Assignee: The United States of America as represented by the Administrator of the National Aeronautics and Space Administration, Washington, D.C.

[21] Appl. No.: 702,115

[22] Filed: Jul. 2, 1976

[51] Int. Cl.$^2$ .......................................... G10K 11/00
[52] U.S. Cl. .................................. 181/213; 181/222; 181/290; 181/293
[58] Field of Search ............ 181/33 GB, 33 H, 33 K, 181/33 HB, 48, 33 D, 33 G, 33 HA, 213, 222, 224, 284, 286, 290, 292, 293

[56] References Cited

U.S. PATENT DOCUMENTS

| 3,850,261 | 11/1974 | Hehmann | 181/33 H |
| 3,948,346 | 4/1976 | Schindler | 181/33 H |

Primary Examiner—L. T. Nix
Assistant Examiner—Benjamin R. Fuller
Attorney, Agent, or Firm—Robert C. Lampe, Jr.; Derek P. Lawrence; Norman T. Musial

[57] ABSTRACT

Sound-suppressing structure comprising stacked acoustic panels wherein the inner high frequency panel is mounted for thermal expansion with respect to the outer low frequency panel. Slip joints eliminate the potential for thermal stresses, and a thermal expansion gap between the panels provides for additional relative thermal growth while reducing heat convection into the low frequency panel.

12 Claims, 4 Drawing Figures

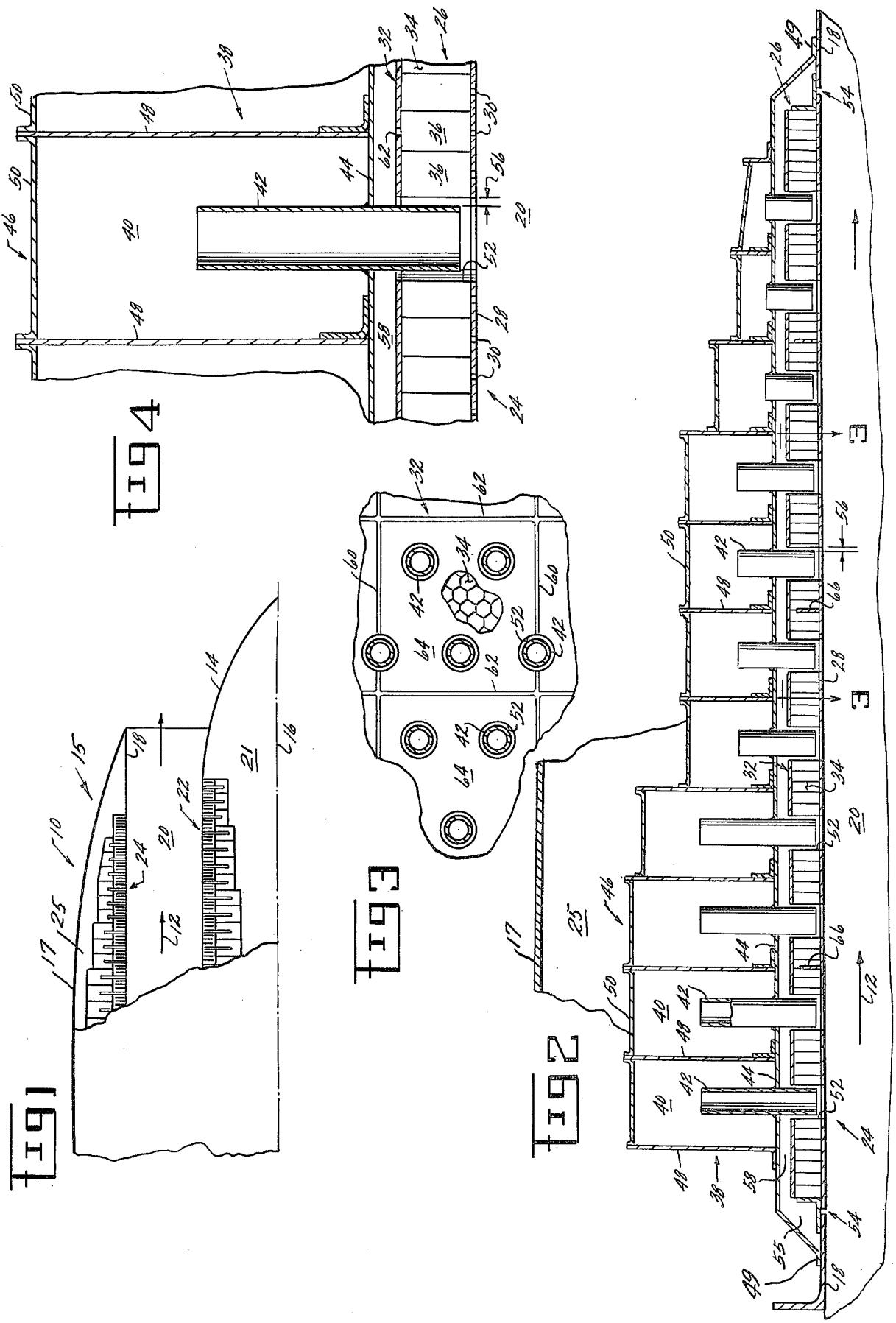

SOUND-SUPPRESSING STRUCTURE WITH THERMAL RELIEF

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

In recent years, increasing attention has been directed at the noise characteristically emitted by aircraft gas turbine engines, and Federal regulations now limit the permissible noise levels. Accordingly, more effective noise suppression techniques are continually being sought by the gas turbine engine design community. One technique which has found wide-spread acceptance in reducing the noise propagating from engine inlet and exhaust ducts is to line the duct walls with a sound-suppression, or sound-absorbent, material. In one form, the material comprises a sandwich of two thin metal facing sheets or skins separated by a core material, generally of the cellular honeycomb variety. This honeycomb sandwich material has its inner skin perforated so that all the cells are vented to the duct flow path. As is well known, the cells function as Helmholtz resonators to tune out noise within a frequency band which is related to the cell size. In order to broaden the band of frequencies suppressed without increasing treatment length, a stacked configuration may be employed wherein a plurality of cellular cavities having a variety of cavity volumes are spaced from the duct by a variety of distances, with a plurality of neck passages provided for communicating between the various cavities and the duct. U.S. Pat. No. 3,819,009, Motzinger, entitled "Duct Wall Acoustic Treatment," which is assigned to the assignee of the present invention and the disclosure of which is incorporated herein by reference, is representative of such a structure.

When such a stacked sandwich material is employed for noise suppression in a hot gas environment, typified by gas turbine engine exhaust nozzles and ducts, a potential differential thermal expansion problem exists. This is due to the large temperature gradient which exists between the hot flow path defining honeycomb facing sheet and the relatively cooler opposite (backside) facing sheet. As the engine is cycled throughout its operating range, cyclic thermal stresses are imposed on the sound-suppression material. These thermal stresses and the resulting distortion and fatigue may reduce the structural life and, thus, effectively increase the cost of the engine over its life cycle.

Therefore, a means is needed for making use of the inherent acoustic advantages of honeycomb sandwich material in a hot gas environment without subjecting it to high levels of thermal stress. In short, the problem is to use the honeycomb structure so as to take advantage of its acoustic properties without incurring structural liabilities in a hot gas environment.

SUMMARY OF THE INVENTION

Accordingly, it is the primary object of the present invention to provide a sound-suppressing structure of the honeycomb variety in which the potential for thermal stresses is minimized.

It is a further object of the present invention to minimize the potential for thermal stresses in stacked cellular acoustic suppression material for disposition in a gas turbine engine exhaust duct.

These and other objects and advantages will be more clearly understood from the following detailed description, drawings and specific examples, all of which are intended to be typical of rather than in any way limiting to the scope of the present invention.

Briefly stated, the above objectives are accomplished in a structure comprising a duct wall and coannular inner, high frequency, and outer, low frequency, panels. The high frequency panels include an inner perforated sheet defining a hot gas flow path and an outer nonperforated sheet sandwiching a cellular honeycomb core. The low frequency panel includes annular resonating chambers external to the high frequency panel with integral hollow tubes which pass through apertures in the high frequency panel to vent the chambers to the hot gas flow path. The chambers vary in size and the tubes vary in length to provide wide-band sound suppression.

Since the high frequency panel shields the low frequency panel from the hot gas environment, a considerable temperature differential exists between the two panels. To accommodate relative thermal expansion, the low frequency panel is recessed into and rigidly attached to the duct wall so as to form a pocket therein. The high frequency panel is slidingly received within the pocket and connected to the duct wall by at least one slip joint to permit relative thermal expansion. The tubes are integral with the low frequency panel and, to ensure interference between these tubes and the high frequency panel due to thermal expansion of the latter, predetermined clearance is established therebetween which results in the apertures being concentric about the tubes at a predetermined temperature differential.

Expansion slots are provided in the nonperforated outer sheet of the high frequency panel to accommodate the thermal expansion effects within the panel itself. Since the slots reduce the hoop stiffness of the panel, ring stiffeners are attached to the inner perforated skin on the surface thereof adjacent the honeycomb core. A thermal expansion gap between the two panels provides for additional relative growth and reduces heat convection into the low frequency panel.

DESCRIPTION OF THE DRAWINGS

While the specification concludes with claims particularly pointing out and distinctly claiming the subject matter which is regarded as part of the present invention, it is believed that the invention will be more fully understood from the following description of the referred embodiment which is given by way of example with the accompanying drawings, in which:

FIG. 1 is a partial cross-sectional view of a portion of a gas turbine engine exhaust duct which is acoustically treated in accordance with the present invention;

FIG. 2 is an enlarged view of the exhaust duct of the engine of FIG. 1 depicting the sound suppressing structure of the present invention in greater detail;

FIG. 3 is a partial sectional view taken along line 3—3 of FIG. 2; and

FIG. 4 is a further enlarged view showing fabrication details of the sound-suppressing structure of FIG. 2.

DESCRIPTION OF THE PREFERRED EMBODIMENT

Referring to the drawings wherein like numerals correspond to like elements throughout, attention is first directed to FIG. 1 wherein a gas turbine engine nozzle 10 embodying the present invention is diagrammatically shown. Hot gases of combustion are expanded through a turbine (not shown) in a manner well known in the art and exit through exhaust nozzle 10 in the direction indicated by arrow 12 to generate a propulsive thrust in the opposite direction. The nozzle is shown to include a rigid centerbody 14 symmetrical about axis 16 and a generally coannular nacelle 15 comprising an external cowl 17 and a duct wall 18 whereby centerbody 14 and wall 18 cooperate to partially define a hot gas passage 20 therebetween. Centerbody 14 is provided with a cavity 21 into which an acoustically treated structure 22 is received to further define passage 20 and to suppress noise propagating therein Similar acoustic treatment 24 is received within a cavity 25 associated with wall 18 for the same reasons.

Referring now to FIGS. 2 and 4 wherein the duct acoustic treatment 24 associated with wall 18 is shown in greater detail, there is provided a high frequency acoustic panel 26 and a low frequency acoustic panel 38, both of which are mounted concentrically within cavity 25. The high frequency panel consists of an inner sheet 28, perforated with a plurality of small diameter holes 30, and an outer nonperforated sheet 32 sandwiching therebetween a cellular core 34 of the honeycomb variety. This pair of sheets is bonded to the honeycomb core by any of several methods such as brazing or diffusion bonding. Each cell 36 is aligned with one of the holes 30 to provide communication between the cell interior and flow passage 20, the cells functioning as Helmholtz resonators to tune out noise within a frequency band which is related to the cell size. This high frequency acoustic panel covers the low frequency acoustic panel and further defines the hot gas flow path 20. As used herein, the terms "low frequency panel" and "high frequency panel" are relative terms, it being well understood that larger chambers are required to suppress lower noise frequencies. The low frequency acoustic panel includes a plurality of resonating chambers 40 which may be formed in a variety of ways but are here formed between a cylindrical inner facing sheet 44 and an outer annular stepped facing sheet 46 separated radially from sheet 44 by a plurality of upstanding partitions 48. The facing sheets and partitions may be attached as by welding or brazing to form a rigid structure which, in turn, is connected to wall 18 as at 49. In fact, in the embodiment shown, stepped facing sheet 46 comprises a plurality of rings 50 between adjacent pairs of partitions 48.

Each chamber 40 is provided with a hollow tube 42 which is integral with facing sheet 44 and which penetrates into the chamber. The high frequency panel 26 has a plurality of apertures 52 extending completely therethrough, the apertures being in general alignment with, and of a larger diameter than, the tubes. Accordingly, the tubes pass through, but are not connected to, the high frequency panel and thus provide communication between the hot gas passage 20 wherein the noise to be suppressed is located and the resonating chambers 40. The resonating chambers vary in size (volume) and the tubes vary in length to provide for wide-band noise suppression as is taught and described in U.S. Pat. No. 3,819,009, previously noted herein.

As discussed earlier, differential thermal expansion exists relative to the ow and high frequency panels. This condition is due to the direct exposure of the high frequency panel, particularly facing sheet 28 which partially defines hot gas passage 20 to the exhaust gas flow through the passage. The low frequency panel 38, on the other hand, is shielded from the hot gases by the presence of the high frequency treatment and, thus, remains substantially cooler. This temperature differential is most pronounced during transient operation such as during engine start-up.

To provide for this relative thermal expansion, expansion means such as slip joints 54 are incorporated to connect duct walls 18 and high frequency panel 26 thereby permitting the high frequency panel to expand as a whole relative to the cooler outer structure. While the expansion means are shown to connect the high frequency panel to wall 18, it will be appreciated that such expansion means can be provided anywhere between the high frequency panel and the low frequency panel in order to compensate for differential thermal growth therebetween. As shown in FIG. 2, facing sheet 44 is recessed within cavity 25 by an amount sufficient to create an annular pocket 55 between facing sheet 44 and the plane of wall 18, and the high frequency panel is nested within this pocket utilizing the slip joints to permit both axial and radial thermal growth with respect to the low frequency panel 38 and wall 18. The tubes 42 are attached to the cooler low frequency panel rather than the high frequency panel since it is desirable from an acoustic point of view to have chambers 40 totally sealed with the only access to the interior thereof provided through the hollow tubes. If the tubes were attached to panel 26, a slip fit would be necessary between the tubes and facing sheet 44 to accommodate thermal expansion, thus presenting the possibility of an acoustic "leak."

To ensure against interference between the tubes and the high frequency panel due to thermal expansion of the latter, a clearance 56 is established in the apertures encircling the tubes. Preferably, the apertures are not placed concentrically about the tubes during fabrication when the entire structure is cold. Instead, since high frequency panel 26 will expand generally uniformly from its center outwardly when heated, each such clearance 56 can be preset such that each tube will be concentric within its aperture when the panel is heated and expanded. This ensures against interference during engine operation when vibrations and aerodynamic loading could tend to distort the nozzle. Note also that an annular gap 58 has been provided between the low and high frequency panels, not only to provide for relative thermal expansion, but also for the purpose of reducing conductivity of heat to the low frequency panel which clearly assists the duct wall 18 in functioning as the load-bearing structure in this portion of the nozzle. It is clear, therefore, that the thermal growth problem between the low and high frequency panels has been overcome.

The remaining concern is with respect to intrapanel thermal stresses, particularly in the high frequency panel. Since the inner-facing sheet 28 will tend to expand at a much greater rate than outer-facing sheet 32, stresses will be imposed on the honeycomb core sandwiched and brazed therebetween which will tend to lean, and to possibly buckle, the honeycomb core. The effect will be most pronounced on the panel ends since the panel can be expected to expand rather symmetrically from the center outwardly. Accordingly, and as shown in FIG. 3, facing sheet 32 has been scored by axial and circumferential slots 60 and 62, respectively, into a plurality of rectangular mosaic-like pieces 64.

Preferably, the pieces should be made as small as possible to minimize the end effects without excessively sacrificing the structural integrity of the panel or its acoustic properties. (Note that the scoring "unseals" some of the high frequency chambers.) Thus, the pieces have relative freedom of expansion in all directions. For a typical gas turbine engine nozzle, slots having a width of about 0.01 – 0.02 inch will significantly reduce the thermal stresses without seriously affecting the noise suppression effectiveness.

Although the sandwich-like structure is not relied upon primarily for its structural strength and stiffness but rather for its acoustic properties, a certain degree of structural rigidity is required. Because the axial slot 60 may reduce the hoop stiffness to the point that it could not withstand anticipated vibrational and other loadings, it may become necessary to attach a plurality of thin ring stiffeners 66 to the backside of the inner-facing sheet 28 adjacent the honeycomb core. Such a stiffener does not suffer thermal stress problems since its excellent heat conduction capability limits the temperature gradient in the stiffener.

It will be obvious to one skilled in the art that certain changes can be made to the above-described invention without departing from the broad inventive concepts thereof. For example, while the present invention has been directed to annular panels for use in gas turbine engine exhaust nozzles, it is clear that the invention is equally applicable to any acoustically treated hot gas flow path regardless of its shape, and the use of the word "panel" is not meant to be limited to any particular shape. While the present invention has been described with particular emphasis on its incorporation into nacelle 15, it is to be noted that a similar structure may be incorporated into rigid centerbody 14 and that incorporation into nacelle 15 is merely illustrative of one possible use of the present invention. Similarly, as noted earlier, the terms "high" and "low" frequency are merely relative terms as used herein and do not limit the scope of the invention to any particular band or bands of frequency.

Having thus described the invention, what is claimed as novel and desired to be secured by Letters Patent of the United States is:

1. Sound-suppressing structure comprising:
   a duct wall partially defining a fluid flow path and having a hollow cavity therein;
   a low frequency acoustic panel within said cavity and having a first cellular core sandwiched between a pair of first facing sheets, one of said first sheets penetrated by a plurality of hollow tubes rigidly attached thereto, one end of each tube extending into a core cell and providing the only access to the interior thereof; and
   a high frequency acoustic panel within said cavity and covering said low frequency panel to further define the fluid flow path, said high frequency panel having a second cellular core sandwiched between a pair of second facing sheets, one of said second sheets perforated with a plurality of small diameter holes communicating with the interiors of the second core cells, wherein
   said high frequency panel includes a plurality of apertures extending completely therethrough in general alignment with the hollow tubes and freely receiving the ends thereof; and
   wherein said high frequency panel is slidingly connected to said duct wall by at least one slip joint to permit relative thermal growth of one of said panels without inducing stresses in the other of said panels.

2. The structure as recited in claim 1 wherein the high frequency panel is spacially separated from the low frequency panel to form a thermal expansion gap therebetween.

3. The structure as recited in claim 1 wherein said duct wall and said perforated facing sheet define a high temperature fluid flow path.

4. The structure as recited in claim 2 wherein the apertures are of a larger cross section than the tubes received thereby, and wherein the tubes are initially located within the apertures such that, when the high frequency panel is subjected to a predetermined temperature differential with respect to the low frequency panel, the relative thermal growth of the high frequency panel causes the apertures to be substantially concentric about the tubes.

5. The structure as recited in claim 2 wherein the apertures are of larger cross section than the tubes received thereby, and wherein the apertures are initially off-centered with respect to the tubes by an amount substantially equal to the thermal growth of the high frequency panel with respect to each tube when the high frequency panel is subjected to a predetermined temperature differential with respect to the low frequency panel.

6. The structure as recited in claim 2 wherein the high frequency panel core is of the honeycomb variety and is attached to its associated facing sheets.

7. The structure as recited in claim 6 wherein the high frequency panel facing sheet bounding the thermal expansion gap is scored through to the core in the form of a mosaic pattern for thermal expansion relief.

8. The structure as recited in claim 6 wherein the high frequency panel facing sheet bounding the thermal expansion gap comprises a plurality of small sheet pieces arranged mosaic-like and separated laterally from each other to provide for relative thermal growth.

9. The structure as recited in claim 8 wherein the high frequency panel is provided with a plurality of stiffening ribs attached to the perforated facing sheet on the side thereof adjacent the honeycomb core.

10. The structure as recited in claim 2 wherein said low frequency panel and said high frequency panel are generally coannular, with the high frequency panel being the innermost of the two panels to partially define the fluid flow path.

11. The structure as recited in claim 2 wherein the tubes generally extend from the perforated facing sheet and partially into the low frequency core cells, the length of the tubes and the size of the cells being such as to form Helmholtz resonators tuned to suppress noise of a predetermined frequency band.

12. A sound-suppressing structure comprising:
    a low frequency acoustic panel having a first cellular core and a multiplicity of rigidly attached hollow tubes penetrating said core cells;
    a high frequency acoustic panel covering said low frequency panel having a second cellular core sandwiched between a pair of facing sheets, one of which partially defines a fluid flow path and which is perforated with a plurality of small holes providing communication between the flow path and the second cellular core, and a plurality of larger holes extending completely through the high frequency panel for the receipt of an end of the hollow tubes; and
    expansion means between said low and high frequency panels for permitting relative thermal growth thereof.

* * * * *